(No Model.)
S. B. PARKER.
Adjustable Tool Handle.
No. 238,959.        Patented March 15, 1881.
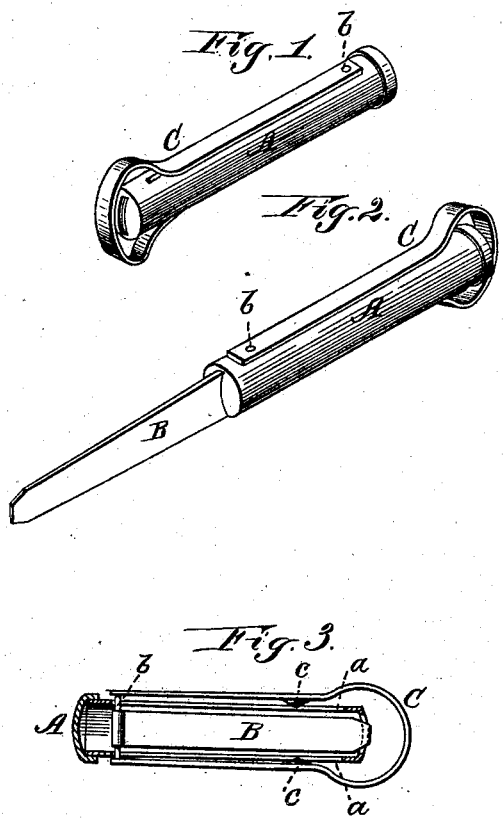
Witnesses:
N. C. McArthur
W. B. Chaffee
Inventor:
Simon B. Parker,
per Chas. H. Fowler,
Attorney.

UNITED STATES PATENT OFFICE.

SIMON B. PARKER, OF BROOKLYN, NEW YORK.

ADJUSTABLE TOOL-HANDLE.

SPECIFICATION forming part of Letters Patent No. 238,959, dated March 15, 1881.

Application filed February 4, 1881. (No model.)

*To all whom it may concern:*

Be it known that I, SIMON B. PARKER, a citizen of the United States, residing at Brooklyn, in the county of Kings and State of New York, have invented certain new and useful Improvements in Adjustable Tool-Handles; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing the tool or blade closed within the handle. Fig. 2 is a similar view with the tool or blade extended for use, and Fig. 3 is a longitudinal central section of the handle with the tool or blade in a closed position.

The present invention has relation to certain new and useful improvements in that class of tools or knives in which the tool or blade is so connected to its handle as will admit of it sliding in or out to close the tool or open it for use, as required.

The object of the invention is to improve the construction of the above class of tools, whereby they are rendered more economical in their manufacture as well as efficient in operation. These objects I attain by the construction shown in the drawings and hereinafter described.

For convenience of description I have shown my invention in the accompanying drawings as applied to a screw-driver; but it must be understood, while the description is confined to the device shown, the invention is equally applicable to all classes of tools adapted to carpentering or other trades or professions, such as dental and surgical instruments and every variety of cutlery.

In the drawings, A represents the handle, of any suitable material and design, but preferably of cylindrical form, and of sufficient length and breadth to contain therein the tool B, in the present instance it being a screw-driver. The hollow handle A has two elongated slots, *a*, extending nearly the entire length of the handle and diametrically opposite each other.

The tool B, at its rear end, has loosely connected to it a pin, *b*, and to this pin is rigidly secured a bail, C, the ends of said pin being of sufficient length to project through the slots *a* the required distance for the attachment thereto of the bail, so that it can freely swing to either end of the handle.

The pin *b*, if desired, may be rigidly connected to the tool B and the ends of the bail and pin loosely secured together, or other means may be employed for connecting the tool and bail together, so long as it will admit of the bail being swung around to either end of the handle.

To retain the bail C in line when the tool B is either within the handle A or extended therefrom, as shown in Fig. 2, the bail, upon its inner sides, has suitable catches, *c*, which engage with the slots *a* to hold the bail in position or in line with the handle.

When the tool is closed within the handle, the bail is in position as illustrated in Figs. 1 and 3, and when the tool is required for use the bail is swung over the opposite end of the handle, in a reverse position to that shown in Figs. 1 and 3, and by pushing the bail forward the tool will be extended, as shown in Fig. 2. The bail C completely controls the movement of the tool B, and when closed down around the handle and the tool extended with the handle in the hand the bail resists all pressure from and against the point of the tool, and holds it firmly in place without lock or spring.

Having now fully described my invention, what I claim as new, and desire to secure by Letters Patent, is—

1. The combination, with the handle A and sliding tool B, of the bail C, pivoted to said tool and adapted to be swung over either end of the handle, substantially as and for the purpose set forth.

2. The handle A, having elongated slots *a* and containing the sliding tool B, in combination with the bail C, having catches *c*, said bail being pivoted to the tool and adapted to be swung over either end of the handle, substantially as and for the purpose specified.

In testimony that I claim the above I have hereunto subscribed my name in the presence of two witnesses.

SIMON B. PARKER.

Witnesses:
J. B. DAVENPORT,
L. O. JENKINS.